United States Patent [19]

Yoshimatsu

[11] Patent Number: 5,077,723
[45] Date of Patent: * Dec. 31, 1991

[54] OPTICAL PICK-UP APPARATUS WHICH UTILIZES PLURAL PRISMS

[75] Inventor: Hiroshi Yoshimatsu, Tokyo, Japan

[73] Assignee: Sony Corporation, Tokyo, Japan

[ * ] Notice: The portion of the term of this patent subsequent to Sep. 13, 2005 has been disclaimed.

[21] Appl. No.: 137,731

[22] Filed: Dec. 24, 1987

[30] Foreign Application Priority Data

Dec. 25, 1986 [JP] Japan .................................. 61-310484

[51] Int. Cl.$^5$ .............................................. G11B 7/12
[52] U.S. Cl. .................................................. 369/110
[58] Field of Search ..................... 369/110, 112, 44–46, 369/13; 350/286, 394

[56] References Cited

U.S. PATENT DOCUMENTS

| 4,545,651 | 10/1985 | Kato et al. ........................ 369/110 X |
| 4,627,688 | 12/1986 | Kobayashi et al. . |
| 4,633,338 | 12/1986 | Sato et al. .............................. 369/13 |
| 4,641,926 | 2/1987 | Shirasaki ............................ 350/394 |
| 4,667,316 | 5/1987 | Suda et al. ....................... 369/110 X |
| 4,682,311 | 7/1987 | Matsubayashi et al. ......... 369/110 X |
| 4,771,414 | 9/1988 | Yoshimatsu ......................... 369/110 |
| 4,773,053 | 9/1988 | Gottfried ........................... 369/13 X |

FOREIGN PATENT DOCUMENTS

| 60-55537 | 3/1985 | Japan .................................. 369/110 |
| 60-113347 | 6/1985 | Japan .................................. 369/110 |
| 60-151855 | 8/1985 | Japan .................................. 369/110 |
| 61-260440 | 11/1986 | Japan .................................. 369/110 |

OTHER PUBLICATIONS

Vol. 9, No. 137 P 363 1860, Jun. 12, 1985 Patent Abstracts of Japan entitled "Magneto-Optical Recording Reproducing Device Having Double Beam Splitter".
Patent Abstracts of Japan Publication No. 58-221812, 4/11/84.

Primary Examiner—Donald McElheny, Jr.
Attorney, Agent, or Firm—Hill, Van Santen, Steadman & Simpson

[57] ABSTRACT

An optical pick-up apparatus comprises a light beam generating source, an objective lens for causing a light beam from the light beam generating source to impinge upon a record medium and receiving a reflected light beam from the record medium, a composite prism constituted by a glass prism element, a crystal prism element and a multi-layer of dielectric material provided between the glass and crystal prism elements, which are bonded together, and so disposed that the light beam from the beam generating source and the reflected light beam from the objective lens enter into the glass prism element through respective different optical paths, the light beam from the beam generating source is directed to the objective lens after passing through the glass prism element and at least two light beams obtained based on the reflected light beam from the objective lens emerge from the crystal prism element, and a photodetecting unit for detecting separately the light beams emerging from the crystal prism element of the composite prism.

5 Claims, 4 Drawing Sheets

OPTICAL PICK-UP APPARATUS WHICH UTILIZES PLURAL PRISMS

BACKGROUND OF THE INVENTION

1. Field of the Invention

The present invention relates generally to optical pick-up apparatus used for reproducing an information signal which is recorded on a record media, and more particularly, is directed to an improved optical pick-up apparatus for causing a light beam to impinge upon a record medium through an objective lens system and for guiding a reflected light beam coming from the record medium through the objective lens system to a photodetector, so as to obtain from the photodetector an output signal representing information read from the record medium.

2. Description of the Prior Art

There has been proposed a so-called optical writable disc as one type of record disc which is available for optically writing an information signal in a record track provided thereon and optically reading an information signal written in the record tracks provided thereon. A magnetooptic disc is one of such optical writable discs and is distinguished in that erasure of information signals and writing of the information signals are able to be conducted repeatedly thereon.

The magnetooptic disc comprises a disc-shaped base, a vertically magnetized layer provided for forming a recording layer on a surface of the disc-shaped base, and a protective layer formed to cover the vertically magnetized layer. Recording of information on the magnetooptic disc is effected by erasing an information signal written therein and writing a new information signal therein, and reproduction of information from the magnetooptic disc is effected by reading an information signal written therein.

In the event of writing of information signals on the magnetooptic disc, the magnetooptic disc is rotated on an axis of rotation at a central portion thereof and a laser light beam demodulated in intensity in response to the information signals is caused to impinge upon the vertically magnetized layer of the magnetooptic disc, on which a predetermined external magnetic field acts, so as to scan the same along a plurality of convolutions of the record track formed concentrically in the vertically magnetized layer so as to surround the central portion of the magnetooptic disc, so that the vertically magnetized layer is provided with inversions in the direction of magnetization in a pattern depending upon the modulation of the laser light beam. The record track is provided with pits arranged in a predetermined pattern which are to be used for, for example, tracking servo-control.

Further, in the event of reading of information signals from the magnetooptic disc, another laser light beam having power smaller than that of the laser light beam used for writing of information signals is caused to impinge upon the vertically magnetized layer of the magnetooptic disc which is rotated so as to scan the same along the record track and a reflected laser light beam from the vertically magnetized layer is detected by a photodetector, so that a reproduced information signal corresponding to the information signal written in the magnetooptic disc, a tracking error signal for use in tracking servo-control, a focus error signal for use in focus servo-control, and other necessary signals are obtained from the photodetector. The reflected laser light beam from the vertically magnetized layer of the magnetooptic disc in the case of reading of information signals is provided, in accordance with the Kerr effect, with rotations of a polarization plane thereof in response to inversions in the direction of magnetization made in the vertically magnetized layer to represent the information signals written therein. Such rotations of the polarization plane of the reflected laser light beam are detected by means, for example, of detecting each of orthogonal polarized components, that is, so-called P-polarized and S-polarized components of the reflected laser light beam separately and comparing detection outputs of the orthogonal polarized components with each other to produce a comparison output. Then, the reproduced information signal is generated based on the comparison output. Further, the tracking error signal is produced based on a detection output of changes in the reflected laser light beam caused in response to the arrangement of pits provided on the magnetooptic disc for the tracking servo-control and the focus error signal is produced based on a detection output of positions of a beam spot formed on the photodetector by the reflected laser light beam or a detection output of the configuration of the beam spot formed on the photodetector by the reflected laser light beam.

The reproduction of information from the magnetooptic disc is carried out by, for example, a disc player which has an optical pick-up apparatus constituting an optical system for reading information from the record track formed in the vertically magnetized layer of the magnetooptic disc.

Figure 1:
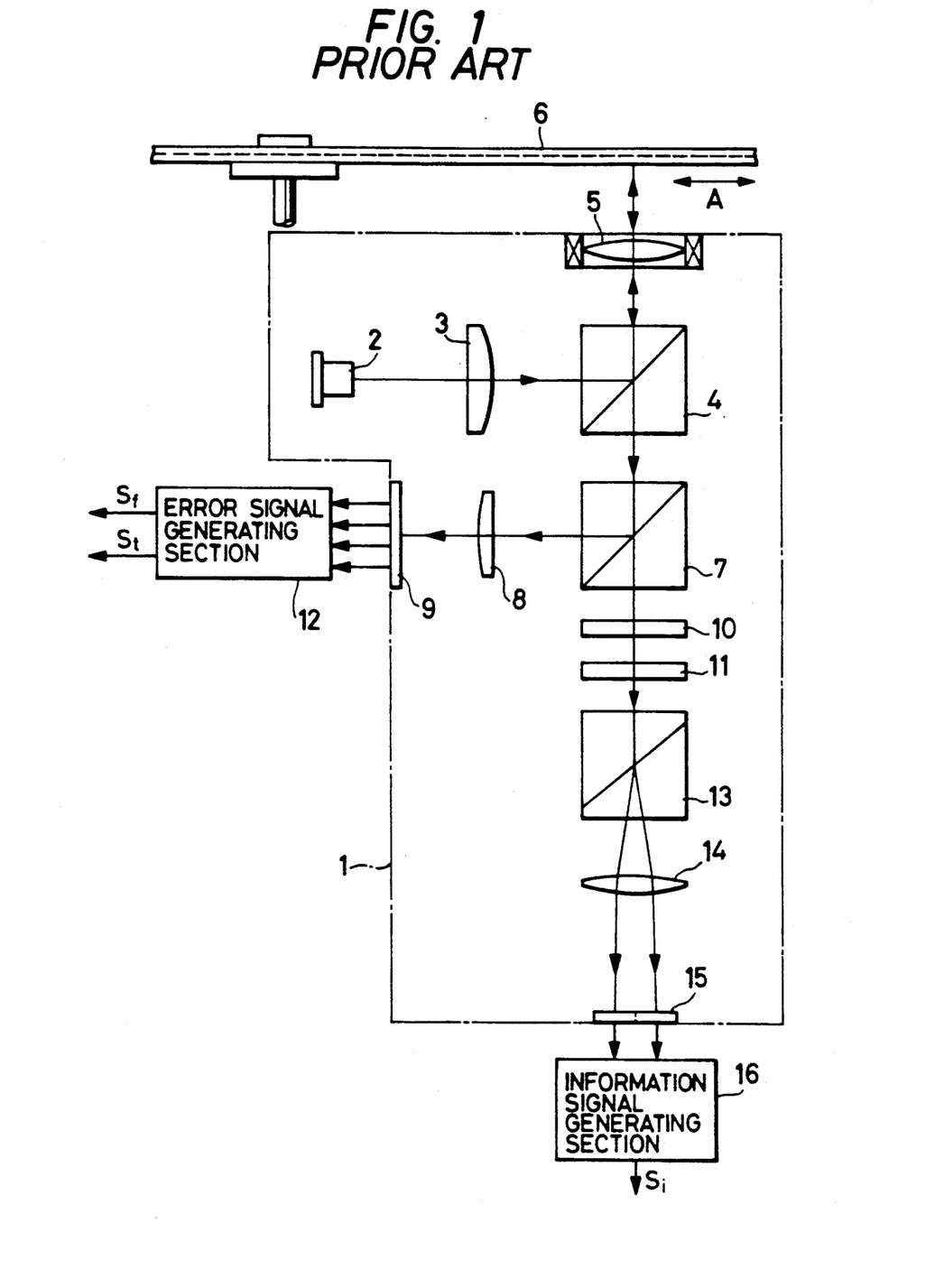
FIG. 1 is a schematic illustration showing an example of a previously proposed optical pick-up apparatus.

One example of a previously proposed optical pick-up apparatus for use in the disc player is schematically shown in FIG. 1 and comprises an optical system 1 formed in the shape of a single unit which contains a semiconductor laser 2, an objective lens 5, a photodetector 15 and other optical elements, and mounted on the disc player to be movable along a direction (indicated by an arrow A) of the radius of a magnetooptic disc 6 having a vertically magnetized layer in which a plurality of convolutions of a record track are concentrically formed.

In the optical pick-up apparatus shown in FIG. 1, a laser light beam emitted from the semiconductor laser 2 passes through a collimating lens 3 and is collimated thereby and enters into a polarizing beam splitter 4 as, for example, a S-polarized component, and is deflected so as to have its optical axis directed toward the objective lens 5. The laser light beam emerging from the polarizing beam splitter 4 is focused by the objective lens 5 to impinge upon the magnetooptic disc 6 so as to be provided with rotations of its polarization plane in response to inversions in the direction of magnetization which are made along the record track in the vertically magnetized layer of the magnetooptic disc 6 to represent information written in the record track and it is further modulated by the arrangement of pits disposed on the record track in the vertically magnetized layer which are to be used for the tracking servo-control. The laser light beam thus provided with the rotations of the polarization plane thereof and modulated by the arrangement of pits is reflected from the record track and is a reflected laser light beam.

The reflected laser light beam from the magnetooptic disc 6 returns through the objective lens 5 and passes through the polarizing beam splitter 4 without any change in the direction of its optical axis and enters into a beam splitter 7 which is a P-polarized component. A part of this reflected laser light beam is deflected to have its optical axis directed to a photodetector 9 through a light-receiving lens 8. The remaining part of the reflected laser light beam passes through the beam splitter 7 in a straight line to a half-wave plate 11 through a phase compensator 10.

The photodetector 9 which receives the reflected laser light beam from the beam splitter 7 generates, for example, a detection output signal obtained in response to the modulation caused on the reflected laser light beam by the arrangement of pits which is provided on the magnetooptic disc 6 for the tracking servo-control and generate another detection output signal obtained in accordance with the configuration of a beam spot formed by the reflected laser light beam on the photodetector 9, and supplies these detection output signals to an error signal generating section 12. The error signal generating section 12 produces a tracking error signal St representing deviations of a beam spot formed by the laser light beam on the vertically magnetized layer of the magnetooptic disc 6 from the center of the record track and a focus error signal Sf representing the defocussing of the laser light beam on the vertically magnetized layer of the magnetooptic disc 6, based on each of the detection output signals from the photodetector 9. The tracking error signal St and the focus error signal Sf are used respectively for the tracking servo-control and the focus servo-control in which a lens driving mechanism (not shown in the drawings) provided in relation to the objective lens 5 is caused to operate.

The reflected laser light beam having passed through the half-wave plate 11 has its polarization plane rotated by 45 degrees and enters into a Wollaston prism 13 and is separated into a pair of orthogonal polarized components, that is, the P-polarized component and the S-polarized component. The P- and S-polarized components from the Wollaston prism 13 pass through a light-receiving lens 14 to the photodetector 15. The photodetector 15 detects separately the P- and S-polarized components by two light detecting elements independently contained therein and generates two detection output signals in response to variations in the respective polarized components which are supplied to an information signal generating section 16. In the information signal generating section 16, the rotation of the polarization plane of the reflected laser light beam caused by the record track in the vertically magnetized layer of the magnetooptic disc 6 is detected by comparing the detection output signals obtained from the photodetector 15 with each other so as to produce a comparison output which varies in response to the rotation of the polarization plane of the reflected laser light beam, and then a reproduced information signal Si is generated based on the compared output. Reproduced information is derived from the reproduced information signal Si.

In the previously proposed optical pick-up apparatus described above, the Wollaston prism 13 is employed for obtaining the reproduced information signal Si, and therefore, two light detecting elements for detecting respectively the orthogonal polarized components of the reflected laser light beam are assembled in the photodetector 15. However, since the photodetector 9 for supplying the detection output signals obtained based on the reflected laser light beam to the error signal generating section 12, which contains a group of light detecting elements, is required to be provided additionally and separately from the photodetector 15, the beam splitter 7 is disposed in an optical path for the reflected laser light beam from the magnetooptic disc 6 so as to divide the reflected laser light beam into two parts, and an optical path for leading one of the divided parts of the reflected laser light beam to the photodetector 9 is provided for producing the tracking error signal St and the focus error signal Sf and another optical path is provided for leading the other of the divided parts of the reflected laser light beam to the photodetector 15 which is provided for the production of the reproduced information signal Si. This results are separately formed. This results in a large number of optical elements such as lenses and beam splitters in being required for constructing the apparatus and the number of process steps for assembling the apparatus is increased, and the cost of producing the apparatus is increased. In addition, the size of the apparatus is increased, and it is difficult to decrease the size.

OBJECTS AND SUMMARY OF THE INVENTION

Accordingly, it is an object of the present invention to provide an optical pick-up apparatus for causing a light beam which is emitted from a light beam generating source and which is to be focused by an objective lens so that it impinges upon a record medium and wherein a reflected light beam from the record medium is guided through the objective lens to a photodetector so as to obtain from the photodetector output signals which represent respectively the information read from the record medium and tracking and focus conditions of the light beam on the record medium, which avoids the aforementioned problems and disadvantages encountered with the prior art.

Another object of the present invention is to provide an optical pick-up apparatus in which a light beam which is emitted from a light beam generating source is focused by an objective lens so as to impinge upon a record medium such as a magnetooptic disc, so that orthogonal polarized components of a reflected light beam returning through the objective lens from the record medium are detected separately and compared with each other so as to produce a detection output signal representing information read from the record medium, and an error signal for servo-control for tracking servo-control or focus servo-control is obtained based on variations in the reflected light beam caused by the record medium, and which has a smaller number of optical elements and has a small size, so as to have an optical path arrangement with relatively simple configuration and reduced overall size.

A further object of the present invention is to provide an optical pick-up apparatus for causing a light beam emitted from a light beam generating source to be focused by an objective lens system so as to impinge upon a record medium and guiding a reflected light beam from the record medium through the objective lens to a photodetector so as to obtain from the photodetector output signals representing respectively information read from the record medium and tracking and focus information of the light beam on the record medium, which is suitable for use in a disc player operative to reproduce information recorded on a magnetooptic disc.

According to the present invention, there is provided an optical pick-up apparatus comprising a light beam generating source, an objective lens for focusing a light beam from the light beam generating source so as to cause it to impinge upon a record medium and receiving a reflected light beam coming from the record medium, a composite prism constituted by a first prism element made of glass, a second prism element made of an uniaxial crystal material, such as rock crystal, and a multilayer of dielectric material provided between the first and second prism elements, which are bonded together, and so disposed that the light beam from the beam generating source and the reflected light beam from the objective lens enter into the first prism element through respective different optical paths, and an optical axis of the second prism element lies in a plane which is substantially perpendicular to an optical axis of the reflected light beam entering into the second prism element after passing through the first prism element and the multi-layer of dielectric material and is inclined at a predetermined angle in relation to a plane of polarization of the reflected light beam entering into the first prism element, so that the light beam from the beam generating source is directed to the objective lens after passing through the first prism element and at least two light beams obtained from the reflected light beam from the objective lens emerge from the second prism element, and a photodetecting unit including a plurality of light detecting elements for detecting separately a plurality of light beams emerging from the second prism element of the composite prism.

In the optical pick-up apparatus thus constituted in accordance with the present invention, the light beam from the light beam generating source enters into the composite prism through the first prism element and is reflected by the multi-layer of dielectric material and has its optical axis directed toward the record medium. Further, the reflected light beam from the record medium enters into the composite prism through the first prism element and at least two light beams formed based on the reflected light beam entering into the first prism element emerge from the second prism element. These two light beams emerging from the second prism element are formed by orthogonal polarized components separated respectively from the reflected light beam entering into the first prism element, and are detected separately by the light detecting elements contained in the photodetecting unit to produce a first detection output signal obtained in response to variations in one of the orthogonal polarized components and a second detection output signal is obtained in response to variations in the other of the orthogonal polarized components. The first and second detection output signals thus obtained are processed to produce a reproduced information signal and an error signal for servo-control such as tracking servo-control or focus servo-control are obtained.

As described above, by means of a single composite prism, the reflected light beam returning through the objective lens from the record medium is separated from the light beam emitted from the light beam generating source, and two light beams formed by the orthogonal polarized components of the reflected light beam from the record medium are obtained individually. Therefore, it is unnecessary to provide individually a beam splitter and an analyzer on an optical path for the reflected light beam from the record medium. Further, since a plurality of light detecting elements for detecting the two light beams from the composite prism respectively are assembled in the photodetecting unit, it is also unnecessary to have an arrangement such that a beam splitter is disposed on the optical path for the reflected light beam from the record medium for dividing the reflected light beam into two parts and an optical path for leading one of the divided parts of the reflected light beam to a photodetector provided for producing an error signal for servo-control and another optical path for leading the other of the divided parts of the reflected light beam to a photodetector provided for producing a reproduced information signal are separately formed. Besides, a half-wave plate is not required to be used. Accordingly, the apparatus according to the present invention can be composed of fewer optical elements and can have a relatively simple configuration and can be small.

The above and other objects, features and advantages of the present invention will become apparent from the following detailed description which is to be read in conjunction with the accompanying drawings.

BRIEF DESCRIPTION OF THE DRAWINGS

FIG. 5 is a schematic block diagram showing a practical example of the arrangement including a photodetecting unit and a signal processing section employed in the embodiment shown in FIG. 2.

DESCRIPTION OF THE PREFERRED EMBODIMENT

Figure 2:
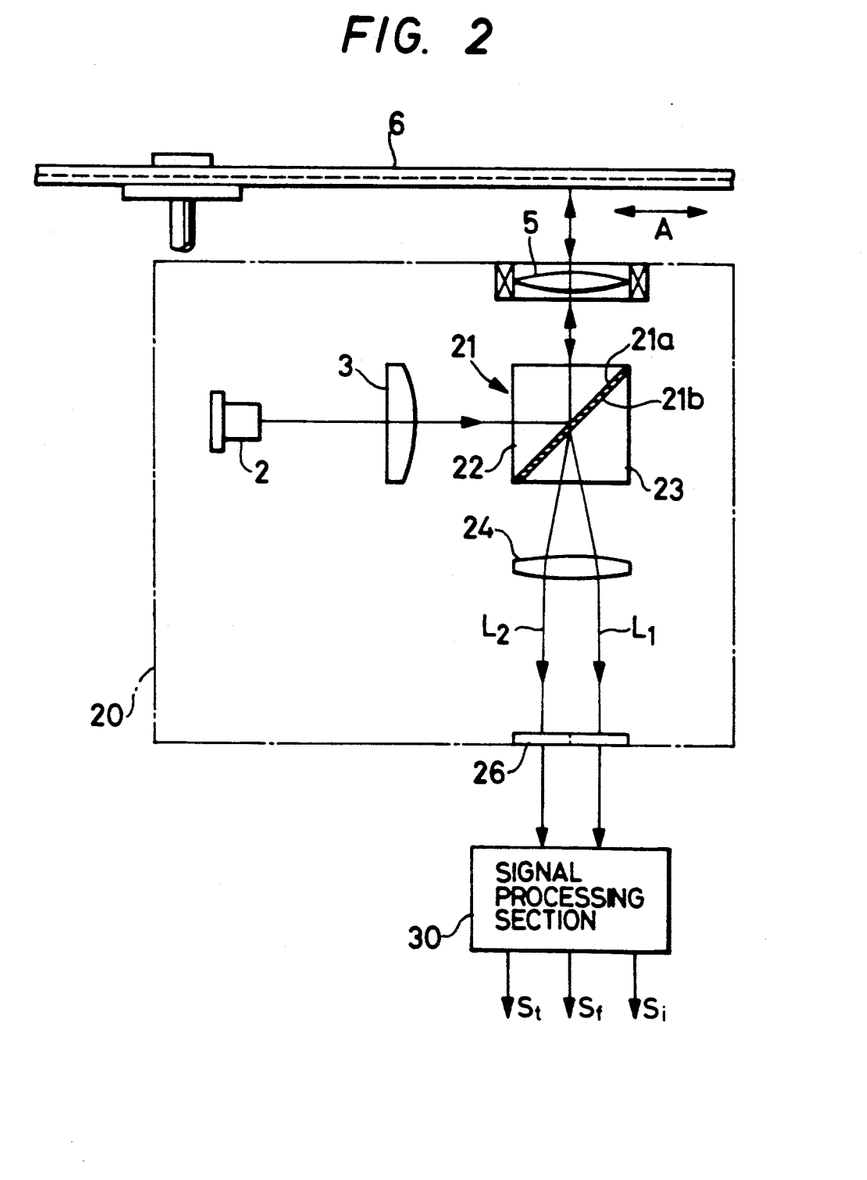
FIG. 2 is a schematic illustration showing one embodiment of optical pick-up apparatus according to the present invention.

FIG. 2 shows an example of the optical pick-up apparatus according to the present invention.

The example shown in FIG. 2 is so arranged so that it can be employed in a disc player for reproducing information recorded on a magnetooptic disc, and comprises an optical system 20 which is formed as a single unit and is mounted on the disc player so as to be movable along a direction (indicated by an arrow A) of the radius of a magnetooptic disc 6 which has a vertically magnetized layer in which a plurality of convolutions of a record track are concentrically formed. A signal processing section 30 is connected to the optical system 20.

In the optical system 20, a laser light beam emitted from a semiconductor laser 2 passes through a collimating lens 3 and is collimated thereby and enters into a composite prism 21 as, for example, a S-polarized component, and is reflected so that its optical axis is directed toward an objective lens 5. The laser light beam emerging from the composite prism 21 is focused by the objective lens 5 so that it impinges upon the magnetooptic disc 6 and is provided with rotations of its polarization plane in response to inversions in the direction of magnetization which are made along the record track in the vertically magnetized layer of the magnetooptic disc so as to represent information which is written in the record track and it is further modulated by the arrangement of pits which are disposed on the record track in the vertically magnetized layer so that it can be used for the tracking servo-control. The laser light beam thus provided with the rotations of the polarization plane thereof and modulated by the arrangement of pits is reflected from the record track and is a reflected laser light beam.

The reflected laser light beam from the magnetooptic disc 6 is received by the objective lens 5 and passes through the objective lens 5 and enters into the composite prism 21.

The composite prism 21 comprises a glass prism element 22 which is a prism element made of glass, a crystal prism element 23 which is a prism element made of uniaxial crystal material such as rock crystal, and a multi-layer 21a of dielectric material provided on the surface of the glass prism element 22 and put between the glass prism element 22 and the crystal prism element 23, which are bonded together with an adhesive agent 21b provided on the surface of the crystal prism element 23 to form a hexahedron in its entirety. The composite prism 21 thus constituted is so disposed that the laser light beam emitted from the semiconductor laser 2 and collimated by the collimating lens 3 as the S-polarized component enters into the glass prism element 22 and is reflected at the multi-layer 21a of dielectric material and emerges from the glass prism element 22 so that it is directed toward the objective lens 5, and further the reflected laser light beam coming through the objective lens 5 as a P-polarized component enters into the glass prism element 22 and passes through the multi-layer 21a of dielectric material without any change in direction of its optical axis and enters into the crystal prism element 23.

Figures 3, 4:
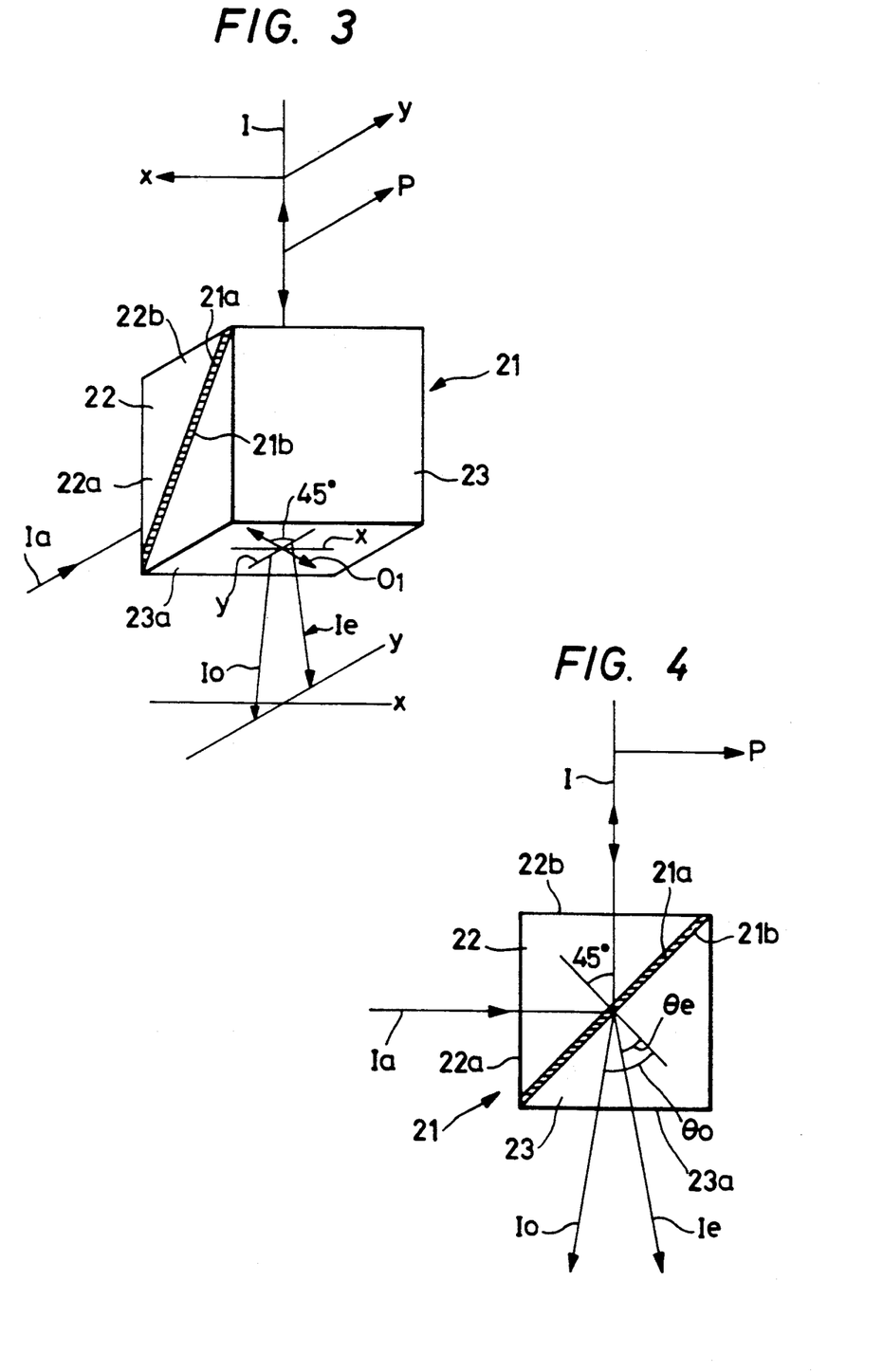
FIGS. 3 and 4 are illustrations used for explaining a composite prism employed in the embodiment shown in FIG. 2.

As shown in FIG. 3, the glass prism element 22 has a plane of incidence 22a which is substantially perpendicular to a direction Ia of the optical axis of the laser light beam which is emitted from the semiconductor laser 2 and which enters into the glass prism element 22 and a plane of incidence and emergence 22b substantially perpendicular to a direction I of the optical axis common to the laser light beam reflected at the multi-layer 21a of the dielectric material and emerges from the glass prism element 22 and the reflected laser light beam entering into the glass prism element 22. The crystal prism element 23 has a plane of emergence 23a which is substantially perpendicular to the direction I of the optical axis of the reflected laser light beam which enters into the glass prism element 22. The glass prism element 22 and the crystal prism element 23 are joined together so as to have a boundary plane portion between them. The boundary plane portion is inclined substantially at an angle of 45 degrees in relation to each of the direction Ia of the optical axis of the laser light beam emitted from the semiconductor laser 2 and the direction I of the optical axis of the reflected laser light beam entering into the glass prism element 22. The boundary portion is provided with a multi-layer 21a of dielectric material which is formed on the surface of the crystal prism element 23 by means of vacuum evaporation and the adhesive agent 21b is deposited on the surface of the crystal prism element 23, so that the glass prism element 22 and the crystal prism element 23 are bonded together. With a configuration thus constituted, distortion of the composite prism 21 which would be caused due to a difference between the coefficient of linear expansion of glass and the coefficient of linear expansion of crystal is prevented.

The optical axis of the crystal prism element 23 lies in a plane which is substantially perpendicular to the direction I of the optical axis of the reflected light beam entering into the glass prism element 22, as indicated by an arrow $0_1$ in FIG. 3 and is inclined substantially at an angle of 45 degrees in relation to a plane of P-polarization (lying in a y-plane perpendicular to a x-plane) of the reflected laser light beam entering into the glass prism element 22.

In the composite prism 21, as shown FIG. 4, the laser light beam emitted from the semiconductor laser 2 which enters into the glass prism element 22 through the plane of incidence 22a thereof as the S-polarized component with the direction Ia of its optical axis substantially perpendicular to the plane of incidence 22a, is reflected at the multi-layer 21a of dielectric material provided in the boundary plane portion and has its optical axis changed in direction by an angle of 90 degrees so as to become laser light beam which emerges from the glass prism element 22 through the plane of incidence and emergence 22b thereof with the direction I of its optical axis which is substantially perpendicular to the plane of incidence and emergence 22b. The following two light beams are obtained at the boundary plane portion based on the reflected laser light beam entering into the glass prism element 22 through the plane of incidence and emergence 22a thereof as the P-polarized component with the direction I of the optical axis which is substantially perpendicular to the plane of incidence and emergence 22b: a first light beam which is the P-polarized component having a direction Ie of its optical axis which is inclined an angle of $\theta e$ in the y-plane in relation to a normal line perpendicular to the boundary plane portion; and a second light beam which is the S-polarized component having a direction Io of its optical axis which is inclined at an angle of $\theta o$ ($\theta o > \theta e$) in the y-plane in relation to the normal line perpendicular to the boundary plane portion. The first and second light beams which are separated from one another emerge from the plane of emergence 23a of the crystal prism element 23. That is, in the composite prism 21, the two light beams of the P-polarized component and the S-polarized component, which are orthogonal polarized components, are formed separately based on the reflected laser light beam which enters through the objective lens 5 into the composite prism 21 in the form of a P-polarized component.

As shown in FIG. 2, the first light beam ($L_1$) of the P-polarized component and the second light beam ($L_2$) of the S-polarized component emerging from the composite prism 21 pass through a common condenser lens 24 and enter into a photodetecting unit 26.

The photodetecting unit 26 contains light detecting elements for detecting respectively the first and second light beams $L_1$ and $L_2$, which are received therein, and detection output signals of the first and second light beams $L_1$ and $L_2$ are obtained separately from the light detecting elements and are supplied to the signal processing section 30.

In the signal processing section 30, the rotation of the polarization plane of the reflected laser light beam caused by the record track in the vertically magnetized layer of the magnetooptic disc 6 is detected by means of comparing the detection output signal of the first light beam $L_1$ and the detection output signal of the second light beam $L_2$ with each other to produce a comparison output which varies in response to the rotation of the polarization plane of the reflected laser light beam, and a reproduced information signal Si is generated based on the comparison output. Reproduced information can be derived from the reproduced information signal Si.

In addition, in the signal processing section 30, the variations in the reflected laser light beam which are caused by the arrangement of pits provided on the magnetooptic disc 6 for the tracking servo-control are detected based on the detection output signals of the first and second light beams $L_1$ and $L_2$ so as to produce a tracking detection output signal, and a tracking error signal St representing deviations of a beam spot formed by the laser light beam on the vertically magnetized layer of the magnetooptic disc 6 from the center of the record track is formed from the tracking detection output signal. Further, the configuration of each of the beam spots formed respectively by the first and second light beams $L_1$ and $L_2$ on the light detecting elements for detecting the first and second light beams $L_1$ and $L_2$ is detected to produce a focus detection output signal, and a focus error signal Sf representing defocus of the laser light beam on the vertically magnetized layer of the magnetooptic disc 6 is formed from the focus detection output signal.

The tracking error signal St and the focus error signal Sf obtained from the signal processing section 30 are used respectively for the tracking servo-control and the focus servo-control in which a lens driving mechanism (not shown in the drawings) is provided for moving the objective lens 5.

FIG. 5 shows a practical example of an arrangement including the photodetecting unit 26 and the signal processing section 30.

In the practical example shown in FIG. 5, the photodetecting unit 26 contains a light detecting element group 27 for detecting the first light beam $L_1$ of the P-polarized component from the composite prism 21, and a light detecting element group 28 for detecting the second light beam $L_2$ of the S-polarized component from the composite prism 21, which are arranged on a common plane. The light detecting element group 27 comprises four light detecting elements 27a, 27b, 27c and 27d, and the light detecting element group 28 also comprises four light detecting elements 28a, 28b, 28c and 28d. Detection output signals Ra, Rb, Rc and Rd are obtained from the light detecting elements 27a, 27b, 27c and 27d constituting the light detecting element group 27, and detection output signals Re, Rf, Rg and Rh are obtained from the light detecting elements 28a, 28b, 28c and 28d constituting the light detecting element group 28. These detection output signals Ra to Rd and Re to Rh are supplied to the signal processing section 30.

In the signal processing section 30, the detection output signals Ra and Rd obtained from the light detecting element group 27 are supplied to an adder 34 and produce an output signal Ra+Rd, and similarly, the detection output signals Rb and Rc obtained from the light detecting element group 27 are supplied and an adder 35 to produce an output signal Rb+Rc. The output signals Ra+Rd and the output signal Rb+Rc are supplied to an adder 36 so that an added output signal $R_1$ (Ra+Rd+Rb+Rc) is obtained from the adder 36. Further, the detection output signals Re and Rh obtained from the light detecting element group 28 are supplied to an adder 37 and produce an output signal Re+Rh, and similarly, the detection output signals Rf and Rg obtained from the light detecting element group 28 are supplied to an adder 38 and produce an output signal Rf+Rg. The output signals Re+Rh and the output signal Rf+Rg are supplied to an adder 39 so that an added output signal $R_2$ (Re+Rh+Rf+Rg) is obtained from the adder 39. The added output signal $R_1$ from the adder 36 and the added output signal $R_2$ from the adder 39 are amplified in amplifying circuits 31 and 32, respectively, and then compared with each other in a differential amplifier 33. The differential amplifier 33 produces a comparison output signal representing the difference between the added output signals $R_1$ and $R_2$ and the comparison output signal is derived from the differential amplifier 33 as the reproduced information signal Si.

The added output signals $R_1$ and $R_2$ are supplied to an adder 40 to produce a sum total output signal $R_3$ (Ra+Rd+Rb+Rc+Re+Rh+Rf+Rg) and the sum total output signal $R_3$ is supplied to each of the sample and hold circuits 41 and 42.

The sample and hold circuits 41 and 42 are supplied also with sampling pulses $P_1$ and $P_2$, respectively, from a sampling pulse generating circuit 43. The sampling pulses $P_1$ and $P_2$ have a time difference therebetween which corresponds to a pattern of the arrangement of pits which is provided on the magnetooptic disc 6 for tracking servo-control. Then, a sample/hold output signal $S_1$ is obtained through the sampling and holding operation to which the sum total output signal $R_3$ is subjected in accordance with the sampling pulse $P_1$ which is derived from the sample and hold circuit 41, and a sample/hold output signal $S_2$ is obtained through the sampling and holding operation to which the sum total output signal $R_3$ is subjected in accordance with the sampling pulse $P_2$ derived from the sample and hold circuit 42. The sample/hold output signals $S_1$ and $S_2$ are supplied to a differential circuit 44 and are compared with each other, and a comparison output signal corresponding to the difference between the sample/hold output signals $S_1$ and $S_2$ is obtained from the differential circuit 44 as the tracking error signal St.

Further, the output signals Ra+Rd and Rb+Rc are supplied also to a subtracter 45 and a difference output signal $R_4$ {(Ra+Rd)−(Rb+Rc)} is obtained from the subtracter 45, and similarly the output signals Re+Rh and Rf+Rg are supplied to a subtracter 46 and a difference output signal $R_5$ {(Re+Rh)−(Rf+Rg)} is obtained from the subtracter 46. Then, the difference output signals $R_4$ and $R_5$ are supplied to an adder 47 and produce an added output signal $R_6$ [{(Ra+Rd)−(Rb+Rc)}+{(Re+Rh)−(Rf+Rg)}] from the adder 47 which is the focus error signal Sf.

Although, in the above described embodiment, the optical axis of the crystal prism element 23 constituting the composite prism 21 lies in the plane substantially perpendicular to the direction I of the optical axis of the reflected laser light beam entering into the glass prism element 22 and is inclined at 45 degrees in relation to the plane of the P-polarization of the reflected laser light beam entering into the glass prism element 22, it is to be understood that the optical axis of the crystal prism element constituting the composite prism used in the optical pick-up apparatus according to the present invention is not necessarily required to be inclined at 45 degrees in relation to the plane of P-polarization of the reflected laser light beam entering into the glass prism element, but may be arranged to incline at an angle smaller or larger than 45 degrees in relation to the plane of the P-polarization of the reflected laser light beam entering into the glass prism element.

What is claimed is:

1. An optical pick-up apparatus comprising,
  a light beam generating source for emitting a light beam,
  an objective lens for focusing the light beam from said light beam generating source to cause the same to impinge upon a record medium and receiving a reflected light beam coming from the record medium, a composite prism comprising a first prism element made of glass, a second prism element made of uniaxial crystal material and a multi-layer of dielectric material provided between said first and second prism elements, which are bonded together, said composite prism being so disposed that the light beam from said light beam generating source and the reflected light beam from said objective lens enter into said first prism element through respective different optical- paths, and an optical axis of said second prism element resides in a plane which is substantially perpendicular to an optical axis of the reflected light beam entering into said second prism element after passing through said first prism element and said multi-layer of dielectric material and is inclined at a predetermined angle in relation to a plane of polarization of the reflected light beam entering into said first prism element, so that the light beam from said light beam generating source is directed to said objective lens after passing through said first prism element and at least two light beams obtained based on the reflected light beam from said objective lens emerge from said second prism element, and a photodetecting unit including a plurality of light detecting elements for detecting separately the light beams emerging from said second prism element.

2. An optical pick-up apparatus according to claim 1, wherein the optical axis of said second prism element is inclined substantially at an angle of forty-five degrees in relation to a plane of P-polarization of the reflected laser light beam entering into said first prism element.

3. An optical pick-up apparatus according to claim 2, wherein said first and second prism elements are bonded together to have a boundary plane portion between, said boundary plane portion being inclined at forty-five degrees in relation td each of optical axes of the light beam from said light beam generating source and the reflected light beam from said objective lens.

4. An optical pick-up apparatus according to claim 3, wherein said first prism element has a plane of incidence and a plane of incidence and emergence substantially perpendicular to the optical axes of the light beam from said light beam generating source and the reflected light beam from said objective lens, respectively, and said second prism element has a plane of emergence substantially perpendicular to the reflected light beam from said objective lens.

5. An optical pick-up apparatus according to claim 1, wherein said second prism element constituting said composite prism is made of rock crystal.

* * * * *